(12) United States Patent
Norling et al.

(10) Patent No.: US 8,317,965 B2
(45) Date of Patent: Nov. 27, 2012

(54) METHOD OF JOINING SURFACES

(75) Inventors: Håkan Lars Erik Norling, Stockholm (SE); Eugeniusz Abram, Solna (SE)

(73) Assignee: Akzo Nobel Coatings International B.V., Arnhem (NL)

( * ) Notice: Subject to any disclaimer, the term of this patent is extended or adjusted under 35 U.S.C. 154(b) by 0 days.

(21) Appl. No.: 10/849,045

(22) Filed: May 20, 2004

(65) Prior Publication Data

US 2004/0231792 A1 Nov. 25, 2004

(51) Int. Cl.
*B29C 65/00* (2006.01)
*B32B 37/00* (2006.01)

(52) U.S. Cl. ............... 156/307.5; 156/273.3; 156/331.7

(58) Field of Classification Search ............... 156/307.5, 156/307.7, 331.7, 273.3, 307.3
See application file for complete search history.

(56) References Cited

U.S. PATENT DOCUMENTS

| | | | | |
|---|---|---|---|---|
| 3,160,543 A | 12/1964 | Elmendorf | ............... | 156/306 |
| 3,582,428 A | 6/1971 | Steinberg | ............... | 156/288 |
| 4,169,005 A | 9/1979 | Fogle | ............... | 156/272 |
| 4,431,757 A | 2/1984 | Okitsu | ............... | 524/25 |
| 4,483,730 A | 11/1984 | Honda | ............... | 156/242 |
| 4,485,840 A * | 12/1984 | Erwin | ............... | 137/240 |
| 4,678,532 A | 7/1987 | Perry | ............... | 156/314 |
| 4,812,366 A | 3/1989 | Duncan | ............... | 428/528 |
| 4,853,061 A | 8/1989 | Leung | ............... | 156/216 |
| 5,092,953 A * | 3/1992 | Derby et al. | ............... | 156/331.7 |
| 5,133,822 A * | 7/1992 | Fujii et al. | ............... | 156/274.8 |
| 5,234,519 A | 8/1993 | Talbot | ............... | 156/212 |
| 5,494,960 A * | 2/1996 | Rolando et al. | ............... | 524/591 |
| 6,616,797 B1 | 9/2003 | Licht | ............... | 156/324.4 |
| 6,831,259 B2 * | 12/2004 | Muegge et al. | ............... | 219/700 |

FOREIGN PATENT DOCUMENTS

| | | | |
|---|---|---|---|
| DE | 19800969 A1 * | 7/1999 | |
| DE | 10001777 A1 * | 8/2000 | |
| EP | 0565752 | 10/1993 | |
| EP | 890451 A1 * | 1/1999 | |
| EP | 0931822 | 7/1999 | |
| EP | 0979712 | 2/2000 | |
| EP | 1190823 | 3/2002 | |
| GB | 1254030 | 11/1971 | |
| JP | 2002046105 A * | 2/2002 | |
| TW | 371283 | 10/1999 | |

OTHER PUBLICATIONS

Abstract for DE 10001777.*
Machine translation of JP2002046105 Dec. 2008.*
English language Abstract of EP0565752.
English language Abstract XP-002257762 of JP54008709.
English language Abstract XP-002257763 of JP05031848.

* cited by examiner

*Primary Examiner* — John Goff
(74) *Attorney, Agent, or Firm* — Kenyon & Kenyon LLP

(57) ABSTRACT

The present invention relates to a method of a method of producing a wood-based product, comprising, in the following order: applying an adhesive composition comprising a solvent, onto the first surface only, drying and heating the adhesive composition applied to the first surface, wherein the solvent is partially dried off, and bringing together the first surface with the second surface, and pressing the two surfaces against each other.

13 Claims, No Drawings

METHOD OF JOINING SURFACES

The present invention relates to a method of joining surfaces. It also relates to a method of producing a wood based product.

In the manufacture of glued products such as laminated beams, veneered products, parquet flooring, core board, block board and plywood etc., assemblies of pieces of wooden materials are joined by applying an adhesive followed by a pressing step.

Some adhesives need a comparatively high content of a solvent, such as water, to have a suitable viscosity at application onto a surface. An excess of solvent is usually also required for emulsion based adhesives, also referred to as dispersion adhesives, and resin based adhesives in order to get a stable emulsion or a stable resin based adhesive. At higher solids content of an adhesive, the viscosity increase due to ageing of the emulsion is more pronounced than at lower solids content.

A gluing process usually involves a physical drying/film formation step and/or a chemical curing step. When an adhesive having comparatively high content of a solvent is used, the pressing time is prolonged in order to enable a sufficient physical drying/film formation process of the adhesive in the glue line. Adhesives which may require long pressing times, are usually those in the form of water-based emulsions, such as polyvinyl acetate adhesives or emulsion polymer isocyanate adhesives, or water-based resins of amino- or phenolic type. When using such adhesives, the moisture content of wooden materials to be glued often has to be lowered before gluing so that the final moisture content in the glued wooden product does not become too high. The lowering of the moisture content in combination with application of wet adhesive may give adverse effects due to the changes in moisture content, which may lead to movements in the materials, giving negative effects such as warping.

Another problem when using emulsion based adhesives is a difficulty in gluing together uneven surfaces. During pressing, the applied glue has a tendency to squeeze out, leaving too little left to be able to fill out the distance between the surfaces at all places.

In order to decrease the pressing time required, various solutions have been suggested. For example, EP 1190823 A2 discloses a method including heating of surfaces. Another approach is to dry the adhesive after application. Methods and devices related to drying of applied adhesives are discussed in the following references: U.S. Pat. No. 3,160,543, U.S. Pat. No. 5,234,519, U.S. Pat. No. 4,812,366, and, EP 0979712 A1.

When gluing together two surfaces of wood based materials, there is usually needed a certain penetration of an adhesive into the wood in order to achieve a strong adhesive joint. Therefore, to ensure a strong joint, usually both layers to be joined have to be wetted with an adhesive layer, by contacting the surfaces with wet adhesive. When combining an already dried adhesive layer with a surface having no adhesive applied, the resulting joint has been regarded as becoming too weak.

It is an object of the present invention to provide a gluing method which gives high quality joints in terms of adhesive strength and water resistance already at short pressing times, when combining a surface with an applied adhesive layer with a surface having substantially no adhesive applied. There is a further object of the present invention to provide an improved method of joining uneven surfaces. The gluing method should suitably also be simple.

The above-mentioned objects are achieved by a method of joining a first and a second surface, comprising, in the following order: applying an adhesive composition comprising a solvent, onto the first surface only, drying and heating the adhesive composition applied to the first surface, wherein the solvent is partially dried off, and, bringing together the first surface with the second surface, and pressing the two surfaces against each other.

The above-mentioned objects are also achieved by a method of producing a wood-based product comprising a first and a second piece of wood-based material, comprising, in the following order: applying an adhesive composition comprising a solvent, onto the first surface only, drying and heating the adhesive composition applied to the first surface, wherein the solvent is partially dried off, and, bringing together the first surface with the second surface, and pressing the two surfaces against each other.

The drying is suitably made by heating the adhesive composition. Suitably, the drying is made by forced drying.

By "forced drying" is herein meant any procedure increasing the drying rate compared to the natural drying of an adhesive layer applied onto a surface occurring due to exposure to ambient air and penetration into the substrate.

The solvent can be dried off by the use of any ways of forced drying, such as dry air, dry gases, air blowing or heating, preferably heating. Examples of suitable ways of heating are radiant heat (e.g. infra-red), warm air blowing, dry air blowing and microwave heating. Preferably, the solvent is dried off by the use of radiant heat or microwave heating, most preferably by radiant heat.

Suitably, from about 10 to about 95 weight % of the solvent is dried off from the adhesive composition, preferably from about 20 to about 90 weight %.

Suitably, the solids content of the adhesive composition directly after the drying is from about 20 to about 95 weight %, preferably from about 35 to about 95 weight %, more preferably from about 50 to about 90 weight %, even more preferably from about 65 to about 85 weight %, most preferably from about 70 to about 80 weight %.

By "solids content" is herein meant the content of constituents of an adhesive, measured according to the following method: 1 g of adhesive is put in a metal lid and subjected to 120° C. in a heating chamber for 30 minutes. The percentage of the adhesive remaining in the lid is defined as the solids content.

By "solvent" is herein meant any substance which evaporates under the test conditions above.

The adhesive composition is suitably heated during drying. However, it is also suitable that the adhesive composition is heated after the drying. Preferably, the adhesive composition is heated during drying. Suitably, the adhesive composition is heated so that the temperature of the adhesive layer when contacting the two surfaces to be joined is from about 30 to about 150° C., preferably from about 40 to about 100° C., most preferably from about 50 to about 90° C.

The adhesive composition suitable for the present method can be any adhesive comprising a solvent. Preferably, the adhesive composition is an aqueous adhesive composition. In one preferred embodiment of the invention, the adhesive composition suitably belongs to the group of emulsion polymer based adhesive compositions. In this case, preferred adhesive compositions are those based on polyvinyl acetate, ethylene-vinyl-acetate, emulsion-polymer-isocyanate, polyurethane, styrene-butadiene, and acrylates. Most preferably, the adhesive composition is a polyvinyl acetate based adhesive composition or an emulsion polymer isocyanate based adhesive composition. In another preferred embodiment of the invention, the adhesive composition suitably belongs to the group of curable resin based adhesive compositions. In this case, preferably, the adhesive composition is an amino resin based or phenolic resin based adhesive composition. The adhesive composition may also comprise both a polymer emulsion and a curable resin.

The original solids content, i.e. the solids content at the time of application, in the adhesive composition is suitably from about 1 to about 95 weight %, preferably from about 10 to about 90 weight %, even more preferably from about 30 to about 70 weight %, most preferably from about 40 to about 60 weight %.

The solvent in the adhesive composition can be any solvent suitable for use in adhesive compositions. Suitably, the solvent is water, or an organic solvent belonging to the group of alcohols, esters, and ketones. Examples of suitable alcohols include methanol, ethanol, propanol, glycols such as ethanediol and propanediol. Preferably, the solvent is water. The solvent in the adhesive composition may also comprise a combination of solvents.

The pressing is suitably performed at a pressure of from about 0.1 to about 10 MPa, preferably from about 0.5 to about 5 MPa, most preferably from about 0.75 to about 3 MPa. The pressing time may vary, and depends on, for example, the adhesive system used, which product to be produced, and which type of pressing is used. In one suitable type of gluing process, the surfaces to be joined are assembled as a whole before the pressing step. In this case, the pressing time is suitably from about 0.01 to about 3000 seconds, preferably from about 0.1 to about 1000 seconds, most preferably from about 1 to about 60 seconds. In another suitable type of gluing process, the surfaces to be joined are continuously assembled and pressed, moving through a roller press, band press, or friction press. In these cases the pressing time is suitable from about 0.001 to about 300 seconds, preferably from about 0.1 to about 60 seconds, most preferably from about 1 to about 30 seconds. In the particular case of a roller press, the pressing time is suitably from about 0.001 to about 10 seconds, preferably from about 0.1 to about 1 seconds.

The pressing is suitably performed as conventional cold-pressing at ambient temperature, suitably from about 0 to about 60° C., preferably from about 5 to about 40° C., such as room temperature. In some cases, e.g. when curable resins are present, the pressing is suitably performed under heating. In those cases when heating is desired, the pressing temperature is suitably from about 40 to about 200° C., preferably from about 60 to about 130° C.

The time between heating and pressing is suitably <30 seconds, preferably <20 seconds, most preferably <10 seconds.

By wood-based materials is herein also, besides materials based on solid wood, also included materials such as fibre-, chip-, and particleboard materials. The wood-based material suitably has a thickness of more than about 1 mm, preferably more than about 5 mm.

The invention is suitable for producing any types of glued products, particularly wood-based glued products such as laminated beams, veneered products, edge-glued products and parquet flooring.

In a preferred embodiment of the invention an aqueous dispersion of a polyvinyl acetate adhesive is applied onto a surface of a piece of a wooden material, whereupon water is dried off by using infra-red radiation so that the adhesive composition has a solids content of from about 60 to about 80 weight %. Another piece of a wooden material is thereafter assembled with the first piece and the two pieces are pressed together.

The invention will now further be described in connection with the following examples which, however, not should be interpreted as limiting the scope of the invention.

EXAMPLES

Example 1

A two-ply product was made using an emulsion-polymer-isocyanate based acetate adhesive having an original solids content of 50 weight %. The ambient temperature was 20° C. A first wooden piece of 16 mm thickness of the size 140 mm×50 mm was coated with 140 g/m² adhesive having an original solids content of 50 weight %. The adhesive layer was dried by heating using infra-red radiation so that the adhesive layer had a solids content of about 70 weight %. The new solids content was determined by weighing the piece. The wooden piece was then directly brought in contact with a second wooden piece having no adhesive applied and pressed together in a cold press (20° C.) at a pressure of 1.5 MPa for 30 seconds. The adhesive strength was measured by doing a "chisel test" directly after pressing. In this test the two glued pieces are forced apart by using a chisel and the percentage of the glued surface that show fibre tear is determined. The glued pieces were also tested according to ANSI/HPVA LF 1996 bondline test.

Example 2

A two-ply product was made using the same conditions, materials and amount of adhesive as in Example 1. However, no drying or heating was made. The two wooden pieces were directly after adhesive application brought in contact with each other and pressed together at a pressure of 1.5 MPa for 30 seconds.

TABLE 1

| Gluing process | Pressing time | % fibre tear | ANSI bondline test |
| --- | --- | --- | --- |
| Example 1 | 30 s | 100% | pass |
| Example 2 (comparative) | 30 s | 0% | fail |

It is concluded that the method of the present invention gives excellent adhesive strength and water resistance already at short pressing times.

The invention claimed is:

1. A method of producing a wood-based product comprising a first and a second piece of wood-based material, the wood-based material selected from the group consisting of solid wood, fiberboard, chipboard, and particleboard, and having respective first and second surfaces, consisting of, in the following order:

applying an aqueous adhesive composition, onto the first surface only, wherein the adhesive composition is an emulsion-polymer-isocyanate based adhesive composition, drying and heating the adhesive composition applied to the first surface, by using forced drying, wherein the water is partially dried off, and the solids content directly after drying is from about 65 to 85 weight %, bringing together the first surface with the second surface, and, pressing the two surfaces against each other, wherein the pressing time is from about 1 to about 60 seconds, and
the pressing is performed at a temperature of from about 0° to about 60° C., and wherein
the wood-based product is selected from the group consisting of laminated beams, veneered products, edge-glued products, and parquet flooring.

2. A method according to claim 1, wherein the heating is made by using IR radiation.

3. A method according to claim 1, wherein from about 10 to about 95 weight % of the water is dried off from the adhesive composition.

4. A method of producing a wood-based product comprising a first and a second piece of wood-based material, the wood-based material selected from the group consisting of solid wood, fiberboard, chipboard, and particleboard, and having respective first and second surfaces, consisting of, in the following order:
    applying an adhesive composition comprising a solvent, onto the first surface only, wherein the adhesive composition is an emulsion-polymer-isocyanate based adhesive composition,
    drying and heating the adhesive composition applied to the first surface, the drying and heating is made by using radiant heat, wherein the solvent is partially dried off, and the solids content directly after drying is from about 65 to 85 weight %, and,
    bringing together the first surface with the second surface, and
    pressing the two surfaces against each other, wherein
    the pressing time is from about 1 to about 60 seconds, and
    the pressing is performed at a temperature of from about 0° to about 60° C., and wherein
    the wood-based product is selected from the group consisting of laminated beams, veneered products, edge-glued products, and parquet flooring.

5. A method according to claim 1, wherein the solids content directly after drying is from about 65 to about 80 weight %.

6. A method according to claim 4, wherein the time between the heating and pressing is <30 seconds.

7. A method according to claim 4, wherein the solids content directly after drying is from about 65 to about 80 weight %.

8. A method according to claim 4, wherein the temperature of the adhesive layer, when contacting the two surfaces to be joined is from about 40 to about 100° C.

9. A method according to claim 1, wherein the time between the heating and pressing is <30 seconds.

10. A method according to claim 5, wherein the solids content directly after drying is from about 70 to about 80 weight %.

11. A method according to claim 1, wherein the temperature of the adhesive layer, when contacting the two surfaces to be joined is from about 40 to about 100° C.

12. A method according to claim 7, wherein the solids content directly after drying is from about 70 to about 80 weight %.

13. A method according to claim 1, wherein the pressing time is from about 1 to about 30 seconds.

* * * * *